April 25, 1939.  J. D. MORGAN ET AL  2,155,674
BRAKE TESTING
Filed Sept. 15, 1936  2 Sheets-Sheet 1

INVENTORS
JOHN D. MORGAN
THOMAS ANDERSON
BY
Edmund G. Borden
ATTORNEY

April 25, 1939.   J. D. MORGAN ET AL   2,155,674
BRAKE TESTING
Filed Sept. 15, 1936   2 Sheets-Sheet 2
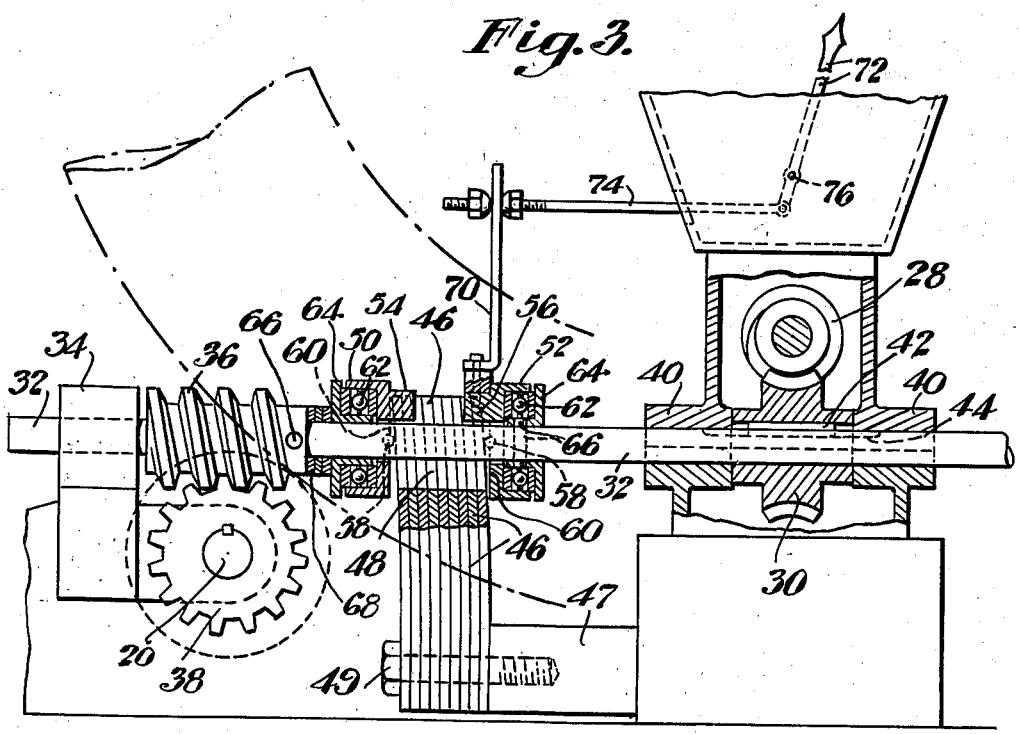
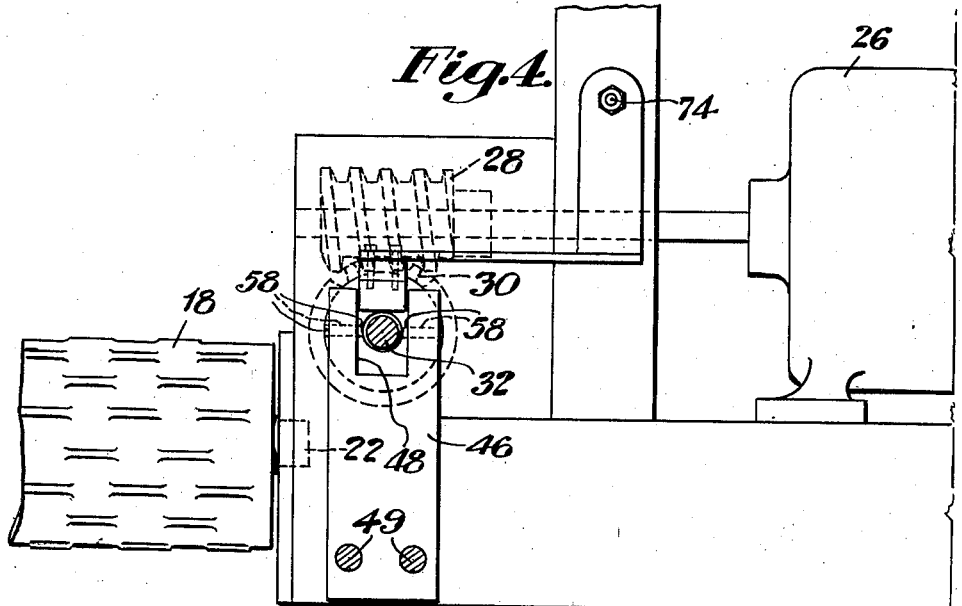
INVENTORS
JOHN D. MORGAN
THOMAS ANDERSON
BY
ATTORNEY Patented Apr. 25, 1939

2,155,674

UNITED STATES PATENT OFFICE 2,155,674

BRAKE TESTING

John D. Morgan, South Orange, and Thomas Anderson, Elizabeth, N. J., assignors to Power Patents Company, Hillside, N. J., a corporation of Maine Application September 15, 1936, Serial No. 100,804

3 Claims. (Cl. 265—25)

This invention relates to brake testing, and particularly to the testing of automobile brakes. A part of the apparatus which is embodied in the brake testing device of the present invention was originally disclosed in the copending application of John D. Morgan, Serial No. 685,219, filed August 15, 1933, for "Motor timing method and apparatus".

The primary object of the present invention is to provide improved apparatus by means of which even an unskilled operator can test the brakes of any one of the wheels of an automobile.

Another object of the present invention is to provide mechanism whereby an operator can test the brakes of an automobile during rotation of the automobile wheel in either direction.

With the above and other objects and features in view, the invention resides in the improved apparatus for testing automobile brakes as hereafter described and more particularly defined in the accompanying claims.

In the following description of the invention reference will be made to the accompanying drawings, in which:

Fig. 3 is a view in side elevation, partly in section, showing the position taken by the parts of the apparatus when brake pressure is applied to a wheel of the automobile under examination; and Fig. 4 is a sectional side view of the apparatus taken on the line 4—4 of Fig. 1.

The preferred method of testing the brakes of an automobile according to the present invention contemplates application of power to a wheel of the automobile from a source independent of the automobile engine through mechanism which will rotate the wheel either forward or backward, development of longitudinal thrust movement in a part of the mechanism by which the wheel is rotated which is proportional to the resistance developed by a braking force applied to the automobile wheel, absorption of such thrust movement by a single flat leaf spring which flexes in either direction an amount proportional to the applied braking force, and measurement of the amount of deflection thereby effected.

Figure 1:
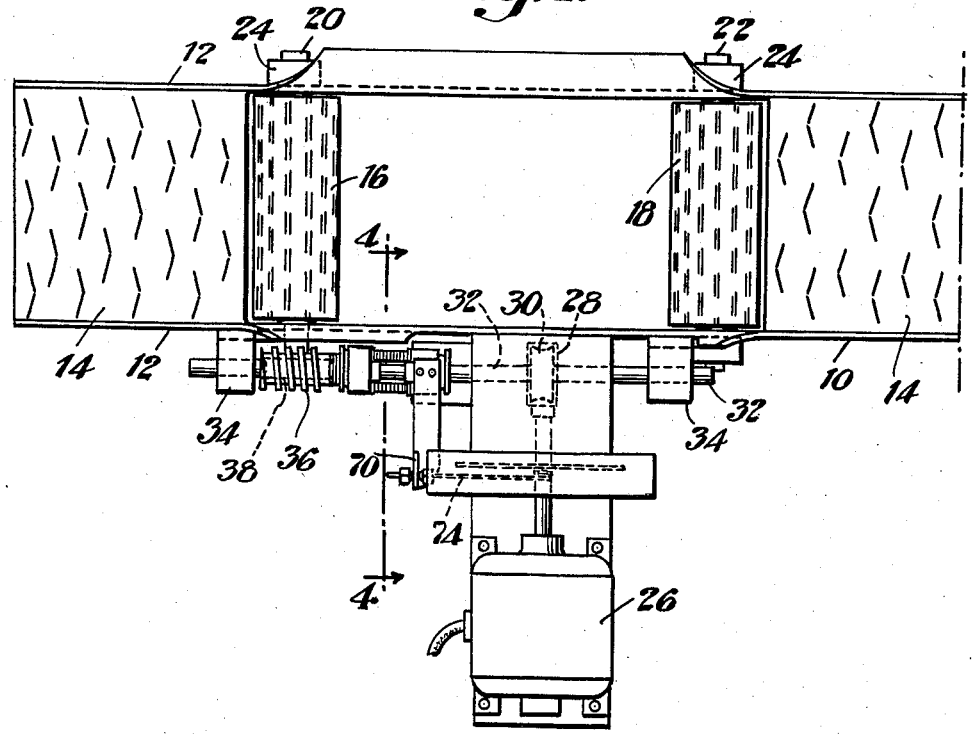
Fig. 1 is a top plan view of a brake testing apparatus embodying the preferred apparatus features of the present invention.
Figure 2:
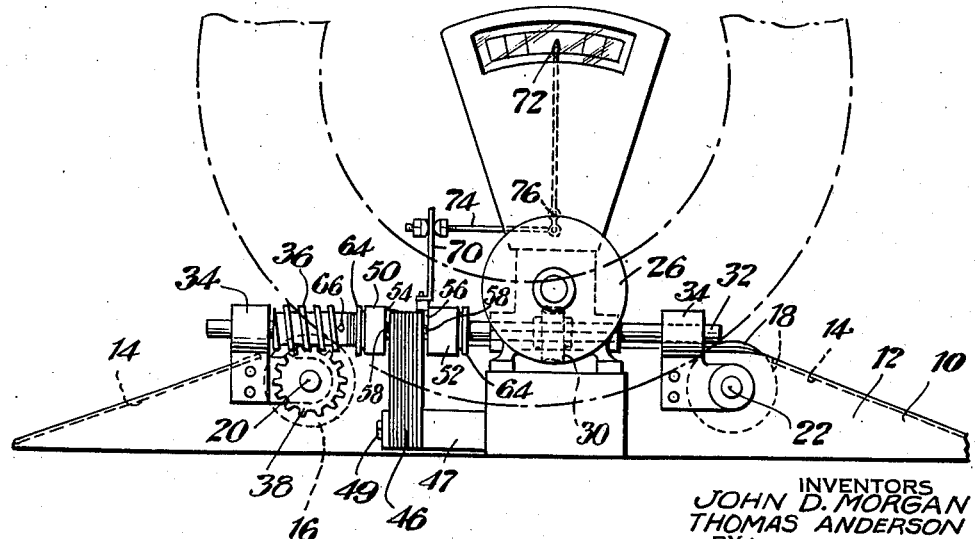
Fig. 2 is a view of the apparatus taken in side elevation.

Referring to Figs. 1 and 2, the principal elements of the brake testing apparatus include an open top box frame 10 having a rectangular horizontal base and spaced parallel side plates 12 between which is supported a roller cradle for a wheel of the automobile. The frame 10 is provided with end plates 14 which serve as ramp approaches up which an automobile wheel can be driven and thereby elevated onto the cradle formed by a pair of rollers 16 and 18 which are mounted in parallel spaced relation transversely of the frame 10 on horizontal shafts 20 and 22, respectively. Shafts 20 and 22 are journaled in bearings 24 supported by side plates 12 of frame 10. The spaces separating rollers 16 and 18 from each other and from the end plates of frame 10, and the length and diameter of the roller faces, are proportioned to provide a cradle to fit inflated pneumatic automobile wheel tires of all standard sizes. Roller 18 functions simply as an idler, while roller 16 is the driving element of the brake testing apparatus and is provided with a non-skid or friction tread surface adapted to engage a tired automobile wheel without slippage. The brake testing apparatus embodies mechanism for rotating the wheel 16 including a reversible electric motor 26, the armature shaft of which carries a worm gear 28 having teeth which mesh with a pinion 30 which is keyed to a drive shaft 32. Drive shaft 32 is journaled in bearings 34 on the frame 10, and a worm gear 36 keyed to one end of shaft 32 has teeth which mesh with a pinion 38 keyed to an extension of drive shaft 20.

That portion of the apparatus which has just been described can be used for cranking an automobile engine through the rear axle of the automobile. To use the apparatus for cranking the automobile engine a rear drive wheel of the car is elevated onto the roller cradle, and by operating the motor 26 with the engine in gear, the engine is cranked through the rear axle, differential and drive shaft. Sufficient mechanical advantage is afforded the motor by a speed reduction ratio of say 50:1 between the worm gear and pinion elements connecting the motor and roller 16 to permit easy cranking of the engine against the full compression resistance of all the engine cylinders. Employing rollers 16 and 18 of approximately 4″ diameter supporting a tired automobile wheel of about 32″ O. D. with the automobile geared to a 4:1 speed ratio between the engine and drive shaft, the speed reduction ratio between the motor and the engine is about 100:1.

As illustrated in Fig. 3, the drive shaft 32 is supported by the bearings 34 and by bearings 40 on each side of the hub of pinion 38, in such a way as to permit of free thrust movement of the shaft in either direction along its longitudinal axis. In order that a key 42 which connects the hub of pinion 30 to shaft 32 may not interfere with this longitudinal movement of the shaft under a thrust load, the key is made much shorter than the hub of the pinion and much shorter than a slot 44 which is cut in the shaft 32 with which the key engages. Likewise the worm 36 is attached to the shaft 32 at a point sufficiently spaced from the left hand end bearing 34 so as to permit longitudinal shifting of the shaft under a thrust load over a distance of at least $\frac{3}{16}$ to $\frac{1}{4}''$.

As previously explained, the brake testing apparatus of the present invention has been designed so as to accurately measure the breaking force applied to an automobile wheel during periods in which the wheel may be rotated in either direction by a source of power such as the electric motor 26 which is entirely independent of the engine of the automobile. In order to insure accurate and constant measurement of the braking force, it is necessary that a single element be used for translating the resistance offered by the braking force to the measuring instrument. According to the preferred design, this element consists of a compound plate spring 46, preferably made up of a plurality of rectangular spring leaves clamped together to form a cantilever beam, one end of which is rigidly connected to a stationary base or frame 47 by means of bolts 49. With the shaft 32 mounted in horizontal position as illustrated, the normal unflexed position of spring 46 lies in a vertical plane with the upper or free end slotted at 48 (see Figs. 3 and 4) so as to partially surround shaft 32 while being spaced therefrom. A pair of collars 50—52 are journalled back to back on shaft 32 with their adjacent ends held in abutting relation against opposite sides of spring 46. Each of collars 50 and 52 has a projecting squared shoulder 54, 56 which extends within slot 48 and forms a rather tight engaging fit with the slot whereby the collars 50—52 are prevented by the spring from turning with shaft 32. The collars 50—52 are the elements which are designed to transmit any thrust movement imparted to shaft 32 by a brake load on the automobile wheel, to the free end of spring 46. In order that this thrust movement may be imparted to the spring only in a line which is coaxial with the longitudinal axis of shaft 32, pins 58 are partly embedded in the bearing faces 60 of collars 50—52 in the same horizontal plane as the central axis of shaft 32, so that the only points of application of any thrust motion of shaft 32 to the free end of spring 46 are in the horizontal plane embodying pins 58 and the axis of shaft 32. Each of the collars 50 and 52 has approximately the design of a ball thrust bearing in which the ball races 62 are held in position inside the collars by cap nuts 64 which rotate with the shaft 32. Two pins 66 which respectively connect shaft 32 and the right hand cap nut 64 and worm 36, are so spaced on shaft 32 that they hold the collars 50—52 in tight engagement through the pins 58 with the opposite faces of spring 46. If it is found necessary to remove one or more leaves of the spring, the space thus left between the pins 66 can be filled with washers 68.

With a braking force resisting the rotation of an automobile wheel mounted on the cradle formed by rollers 16 and 18, and with the shaft 32 rotating in a clockwise direction, the thrust movement of the shaft 32 caused by the resistance offered by the brakes to the rotation of gear 38 will be toward the left as viewed in Fig. 3, thus deflecting the free end of spring 46 away from its normal vertical position a distance which is proportionate to the braking load applied to the automobile wheel. In order to measure the amount of deflection of the spring 46 from its normal unflexed position a bracket 70 is attached to the collar 52 and this bracket is in turn connected to the lower end of a pivoted scale pointer 72 by means of a threaded connecting rod 74. The pointer 72, which is pivoted on pin 76, reciprocates over a scale which is graduated in terms of safe and unsafe braking pressure. It will be understood that the collar 52 and the vertical portion of bracket 70 move horizontally with any thrust movement of shaft 32 a distance which exactly corresponds with the amount of deflection of spring 46 at the plane of contact of pins 58 with spring 46, and that the resulting deflection of the spring is accurately proportioned to, and can therefore be calibrated in terms of, the braking force which causes thrust movement of the shaft 32 against the resistance offered by the spring 46.

By employing the apparatus of the present invention it is possible for even an unskilled operator to make an accurate and relatively rapid test of the brakes of any one of the wheels of an automobile to determine whether such brakes are applying a safe amount of resistance to the rotation of the wheel. The brake testing apparatus can be operatively connected to the automobile wheel ready for test within the short time required to drive the automobile wheel onto the roller cradle of the instrument. The apparatus is so simple in its design that it can be readily shifted from one position to another by a single operator.

The invention having been thus described, what is claimed as new is:

1. In automobile brake testing apparatus, means for rotating a wheel of the automobile including a reversible motor and a rotary drive shaft and gear train connecting the motor and wheel, such shaft being mounted so as to permit movement in either direction along its longitudinal axis under a thrust load, a multiple leaf flat spring having one end fixed and having a socket at its other free end partly surrounding and spaced from the drive shaft, a pair of spaced thrust collars journaled on said shaft at opposite sides of the free end of the spring and held against rotation by the spring socket, bearing pins on opposed faces of each collar aligned with the drive shaft and contacting opposite sides of the spring, said spring being mounted in unflexed position at right angles to the shaft when the shaft is under no thrust load, means attached to the shaft holding each collar in abutting relation to the spring, and mechanism for measuring the resistance developed by a braking force applied to the automobile wheel comprising a brake resistance indicator operatively connected to one of the collars for actuation thereby an amount proportional to the deflection of the spring under a longitudinal thrust movement of the shaft.

2. In automobile brake testing apparatus, a pair of parallel spaced horizontally journalled rollers adapted to form a cradle for an automobile tired wheel, a reversible motor and drive shaft and reduction gear mechanism connecting the same to one of said rollers whereby a wheel of said automobile can be rotated in either direction, a mounting for said drive shaft permitting movement thereof in either direction along its longitudinal axis under a thrust load, a flexible cantilever beam disposed at right angles to said drive shaft and operatively connected thereto so as to oppose thrust movements of said drive shaft while undergoing deflection therewith, means operatively connecting the drive shaft and beam mounted to insure application of the thrust load to the beam in a direction aligned with the axis of the shaft, and mechanism for measuring the resistance developed by a braking force applied to the automobile wheel comprising a brake resistance indicator operatively connected to the beam for actuation thereby an amount proportional to the deflection of the beam under a longitudinal thrust movement of the shaft.

3. In automobile brake testing apparatus, means for rotating a wheel of the automobile including a reversible motor and a rotary shaft and gear train connecting the motor and wheel, a mounting for the shaft permitting longitudinal movement thereof in either direction under a thrust load, a cantilever beam mounted at right angles to the shaft and having its unsupported end operatively connected to the shaft so as to deflect in either direction an amount proportional to the thrust movement of the shaft, and mechanism operatively connected to the shaft for measuring the deflection of the beam under a brake resistance applied to the automobile wheel.

JOHN D. MORGAN.
THOMAS ANDERSON.